United States Patent [19]
Inoue et al.

[11] Patent Number: 6,154,610
[45] Date of Patent: Nov. 28, 2000

[54] HOUSING AND CONTROL UNIT FOR UNDERWATER CAMERA

[76] Inventors: Akihide Inoue, 3-9-6 Dai, Kamakura, Kanagawa 247; Yoshiyuki Takematsu, 8-8-14-303 Nishigotanda, Shinagawa-ku, Tokyo, both of Japan

[21] Appl. No.: 09/327,857

[22] Filed: Jun. 8, 1999

[30] Foreign Application Priority Data

Jul. 17, 1998 [JP] Japan ................................. 10-204085

[51] Int. Cl.⁷ ............................ G03B 17/08; G03B 15/03
[52] U.S. Cl. ............................................................ 396/28
[58] Field of Search ................................................ 396/28

[56] References Cited

U.S. PATENT DOCUMENTS

4,326,785  4/1982  Tsukamoto et al. .................. 396/28
4,335,944  6/1982  Marshall ................................. 396/28
5,142,299  8/1992  Braun ..................................... 396/28

*Primary Examiner*—W. B. Perkey
*Attorney, Agent, or Firm*—Majestic, Parsons, Siebert & Hsue P.C.

[57] ABSTRACT

An underwater camera housing for enclosing a camera for use with a flash unit has a cable connector to which a signal-transmitting cable extending to the flash unit is attached and a link switch is provided on its outer surface by which the transmission of signals through the cable can be cut off or connected again. The signal transmitted through the cable may be electrical signals or light signals. If light signals are transmitted from the housing to control the flash unit, a circuit is provided for generating an electrical signal to prepare the camera for flash photography and the link switch serves to control the generation of this electrical signal such that the camera can be prepared selectively either for flash or natural-light photography.

6 Claims, 7 Drawing Sheets

HOUSING AND CONTROL UNIT FOR UNDERWATER CAMERA

BACKGROUND OF THE INVENTION

This invention relates to a housing for an underwater camera and more particularly to such an underwater camera housing with a control unit for controlling the operation of a stroboscopic lamp, or a flash lamp, attached to the camera.

A flash lamp is nearly indispensable in underwater photography because red light is more easily absorbed by water and the available light is usually insufficient, that is, there is the basic problem of color imbalance. A flash lamp for underwater photography is usually held at a position away from the camera by means of an elongated arm or the like in view of the presence of small objects such as plankton and grains of sand. For this reason, it has been known to attach a base plate to the bottom of a housing for an underwater camera and to set the flash lamp at the tip of a bendable arm extending from the base plate such that the arm can be moved to change the position of the flash lamp and to adjust the lighting condition, depending on the circumstances. When it is desired to photograph a target object as clearly as possible without any shadows, the lamp may be placed in front near the camera or somewhat above the front of the camera. If some shadows are desired, say, for emphasizing a contrast, the lamp may be placed at a relatively low position on the right-hand side or left-hand side of the camera for side lighting. In other words, underwater photography is unique in that the flash lamp is usually at a position relatively far from the camera and its position is always changing.

When there is sufficient natural light, or when it is desired to use a bluish tone to express the feeling of being in an underwater world, for example, the flash lamp is not required, and the photographer must switch off the lamp at the tip of the arm by removing his/her face from the finder of the camera to look at the lamp switch. The underwater photographer's body is always exposed to a water current and the balance is precarious. Under such a condition, the photographer must keep changing the hand which holds the camera, as well as the body position when extending a hand and grabbing the camera. After the lamp is switched off, the photographer must change his/her body position again to look through the finder and get ready to take the next picture. In short, in order to carry out this simple operation of switching off the flash lamp, the photographer is required to undergo many more troublesome motions than in an above-ground condition. As a result, an underwater photographer often misses a chance to take a rare picture. It now goes without saying that it also takes much more time under the water to switch on the flash lamp than above the ground.

SUMMARY OF THE INVENTION

It is therefore an object of this invention to provide a housing for an underwater camera being used with a flash unit including a flash lamp such that the link between the camera and the lamp can be cut off or connected back again by operating a switch on the side of the camera, that is, without reaching for the lamp which may be positioned far away from the camera.

An underwater camera housing embodying this invention, with which the above and other objects can be accomplished, may be characterized as having not only a cable connector terminal on its outer surface for connecting a signal-transmitting cable extending to the flash unit, but also a link switch also on its outer surface for allowing and disallowing the signal transmission between the camera and the flash unit through the cable.

With the underwater camera carried inside such a housing, the user can freely choose between a flash photography and a natural-light photography without looking away from the finder on the camera or reaching for the flash unit relatively far from the position of the camera because the link switch is right on the camera, near the hand which holds it. In summary, the user can instantaneously decide whether to use the flash unit without changing his/her body position.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, like or equivalent components are indicated by the same numerals even where they are components of different devices and may not necessarily be described repetitiously.

DETAILED DESCRIPTION OF THE INVENTION

Figure 1:
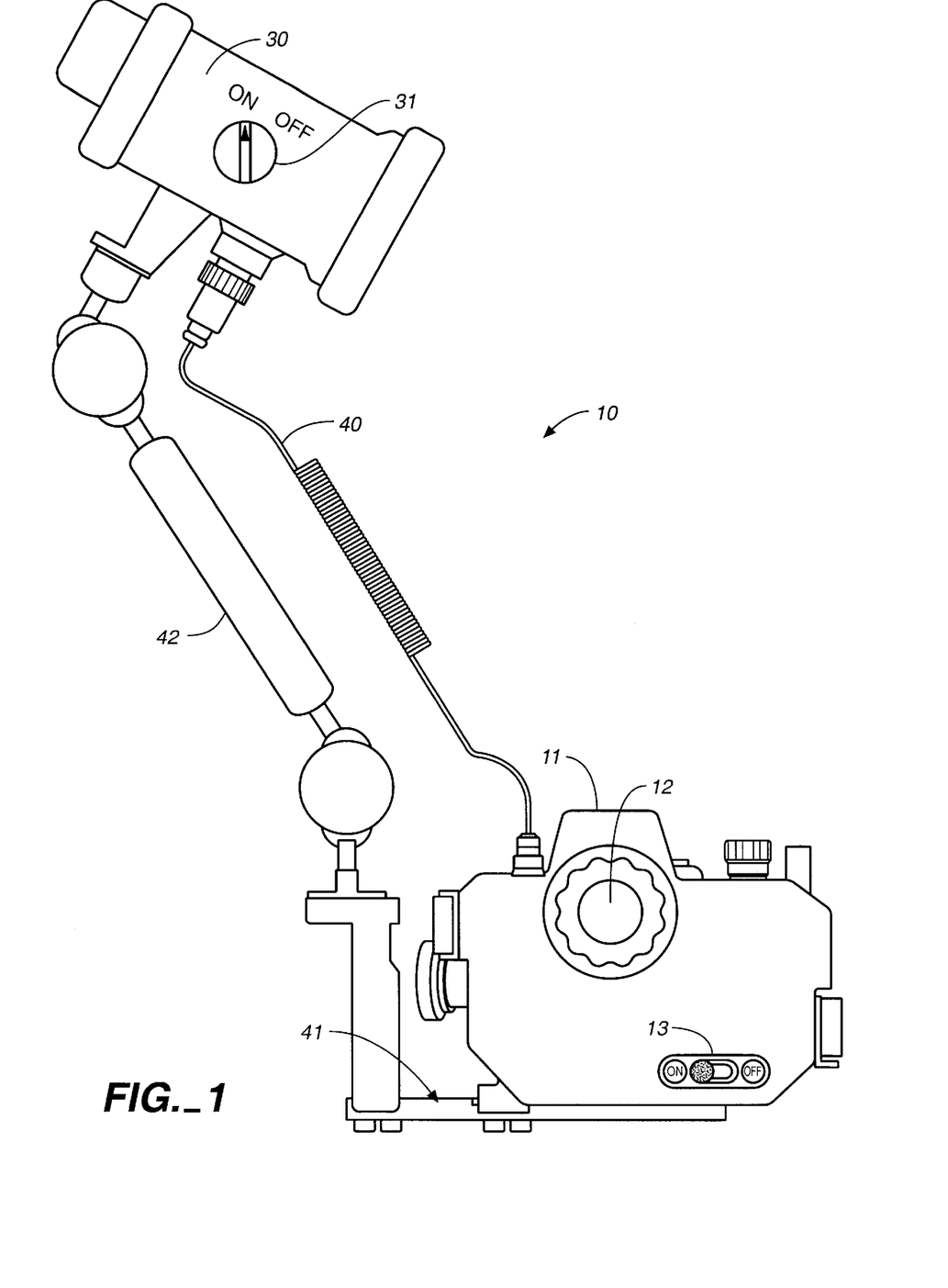
FIG. 1 is a schematic view of a system embodying this invention with an underwater camera connected to a flash lamp by a cable for conducting electrical signals.

The invention is described next by way of examples. FIG. 1 shows a basic system 10 for underwater photography with a camera (not shown) protected inside a water-proof housing 11 and a flash lamp 30 connected thereto by a cable 40 for transmitting electrical signals therethrough. The housing 11 is shown as a back view with a finder 12 and a link switch 13 for making and breaking its connection with the flash lamp 30. The flash lamp 30 is attached to the tip of an elongated articulated member herein referred to as an arm 42 of which the bottom is attached to a base plate 41 affixed to the bottom of the camera housing 11. When its user reaches an underwater site for underwater photography, the position and orientation of the flash lamp 30 are adjusted to get ready with the system 10. During this preparatory period, the flash lamp 30 is switched on through its power switch 31. With the system 10 embodying this system, the user is thereafter no longer required to touch this power switch 31 until the underwater work is completed and the user comes back on the boat or the land because the user can control the flash lamp 30 through the link switch 13 provided on the camera housing 11. In other words, the user switches the link switch 13 to be in the ON condition when taking a picture with a flash and in the OFF condition when taking a picture with only natural light.

Figure 2:
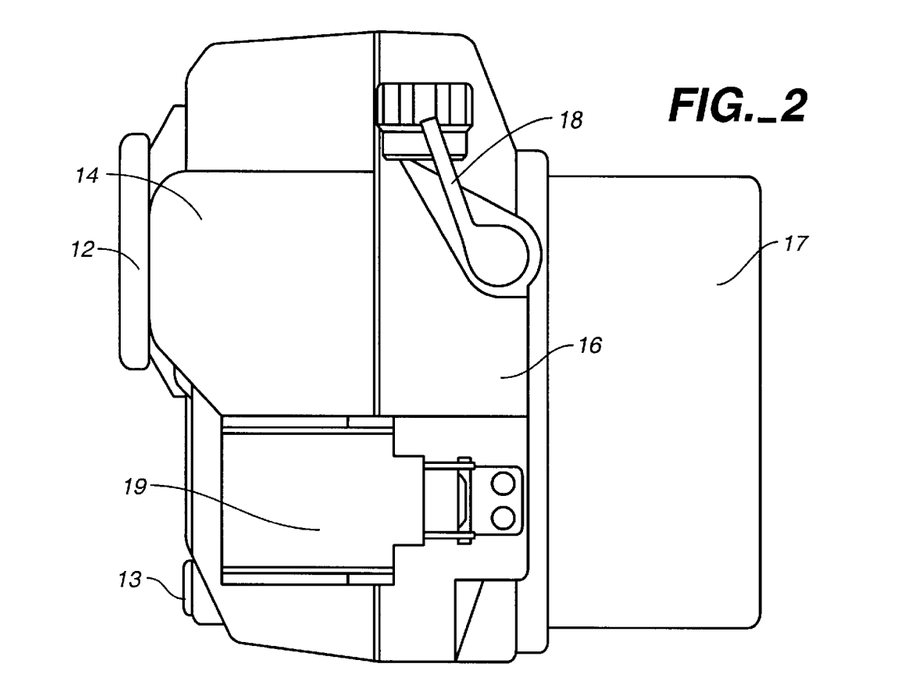
FIG. 2 is a side view of the camera housing shown in FIG. 1.

FIG. 2 is a side view of the camera housing 11 shown in FIG. 1. The housing 11 comprises a back section 14 provided with the finder 12 and the link switch 13 as described above and a front section 16 provided with a lens port 17 and a shutter lever 18. These two sections 14 and 16 are adapted to engage together and become locked together under this engaged condition by means of a pair of locking mechanisms 19 at both side sections of the housing 11.

Figure 3:
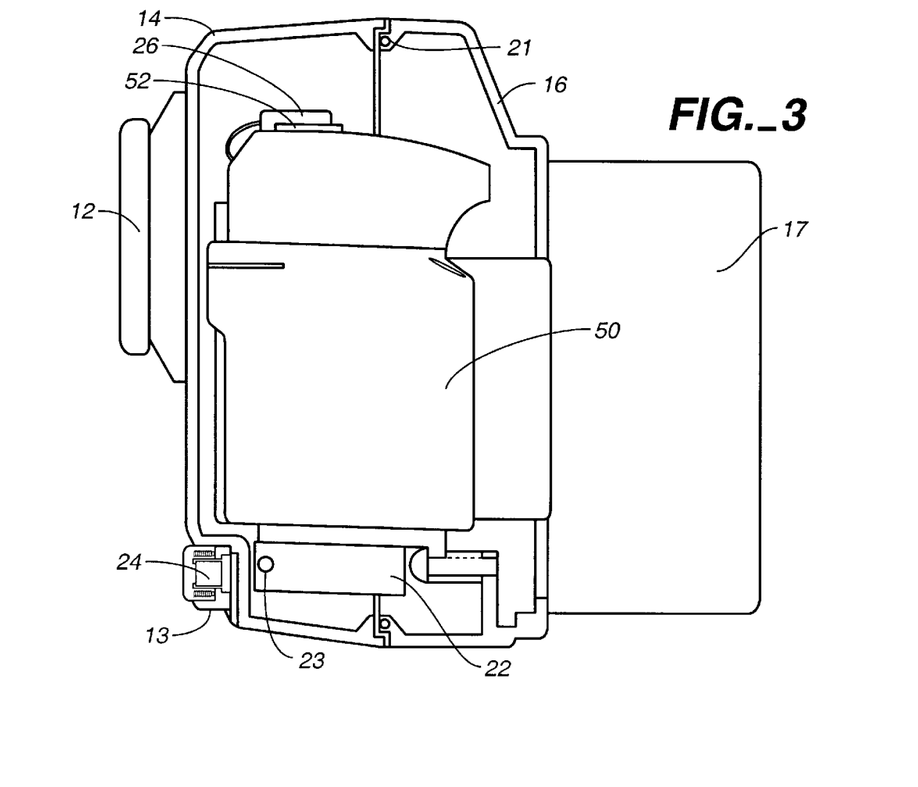
FIG. 3 is a vertical sectional view of the camera housing of FIGS. 1 and 2.

FIG. 3 is a vertical sectional view of the same camera housing 11 showing its back and front sections 14 and 16 sandwiching a rubber ring 21 therebetween and containing therein a camera 50. A circuit box 22 is disposed below a seat structure to which the camera 50 is affixed by means of a screw mechanism. Behind the circuit box 22 is a magnetic response sensor 23 connected to a magnet button 24 of the link switch 13 on the outer surface of the back section 14 of the housing 11. At the top of the camera 50 is an electrical connector 52 to which is connected a housing circuit connector 26 extended from the circuit box 22.

Figure 4:
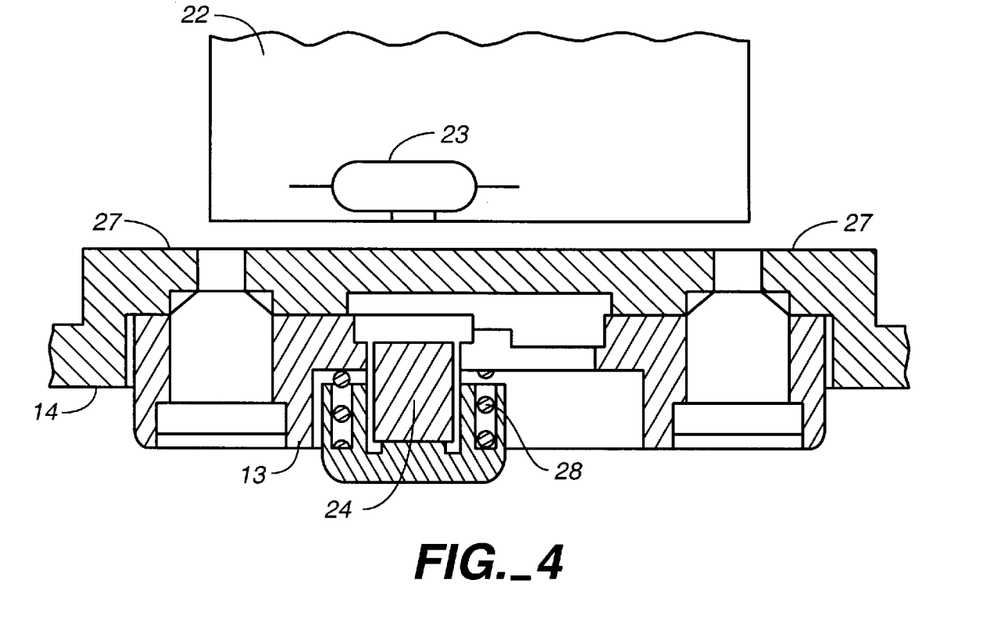
FIG. 4 is a horizontal sectional view of the link switch and components adjacent thereto.

As shown in FIG. 4 more in detail, the link switch 13 is secured to the outer surface of the back section 14 of the housing 11 by means of screws 27 provided with waterproof rubber pieces. The magnet button 24 of the link switch 13 is subjected to a biasing force of a spring 28 in the backward direction (to the left in FIG. 3 and the downward direction in FIG. 4) and is supported so as to be stable in lateral directions. When pressed forward against this biasing force, the magnet button 24 becomes slidable sideways such that the link switch 13 can be switched on or off. Such an operation on the magnet button 24 is detected by the magnetic response sensor 23 disposed at a backward position of the circuit box 22 inside the housing 11, changing the condition of the link switch 13 between ON (for flash photography) and OFF (for natural light photography), as explained above.

If the user adjusts the position and the orientation of the flash lamp 30 and switches on its power switch 31 after the system 10 described above is carried to an underwater site, an electrical READY signal begins in response to be transmitted from the flash lamp 30 to the camera 50 through the cable 40 (if the link switch is ON), indicating that the flash lamp 30 is now ready to emit flash light. The transmission of this READY signal continues, while the link switch 13 remains in the ON condition, until there is a flash signal transmitted from the camera 50.

As the user gets ready to take a picture with a flash by keeping the link switch 13 in the ON condition such that the READY signal from the flash lamp is received directly by the camera and as the shutter button (not shown) is half pushed in, the central processing unit (not shown) of the camera sets its exposure time to a specified length (usually about $1/125$ seconds) longer than the flash time for the convenience of synchronization.

When the shutter button is completely pushed in, the shutter inside the camera is opened and an electrical START signal is transmitted from the camera 50 to the flash lamp 30 through the cable 40, thereby causing the flash lamp 30 to start emitting light. As the emitted light is reflected by a target object and is received by the camera 50 through its lens (not shown), the camera 50 quickly calculates a proper exposure and transmits an electrical STOP signal to the flash lamp 30 through the cable 40 so as to control the amount of emitted light from the flash lamp 30 accordingly. Upon receiving the STOP signal, the flash lamp 30 stops the emission of light immediately, and the shutter of the camera 50 is closed shortly thereafter to complete the picture-taking sequence.

If the user wishes to take a picture under a natural-light condition, the link switch 13 is kept in the OFF condition such that the READY signal from the flash lamp 30 is not received by the camera 50. As a result, the exposure time of the camera is not set to the aforementioned specified length determined for the convenience of synchronization with the flash as the shutter button is pushed in. Thus, an exposure time suitable to the given natural-light condition can be freely selected. This mode of photography is particularly valuable when, for example, the user is at a shallow position and is aiming the camera upward.

Figure 5:
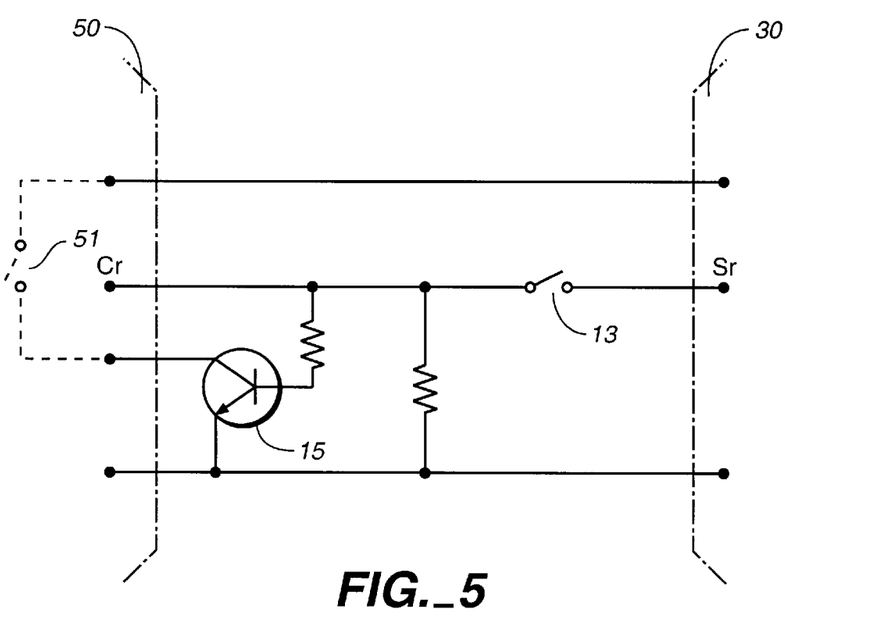
FIG. 5 is an example of circuit diagram for the housing of FIGS. 1–3 near its link switch.

If the camera 50 and the flash lamp 30 are of the kind (such as those produced by Nikon) that uses a "high" voltage signal (say, about +3V) as the aforementioned READY signal by which the camera 50 is informed that the flash lamp 30 is ready to emit light, the circuit structure of the housing 11 around the link switch 13 may be as shown in FIG. 5 wherein numeral 15 indicates a transistor and numeral 51 indicates a switch for controlling the output of electrical signals from the camera 50 to the flash lamp 30 when its shutter button is pressed. If the link switch 13 is ON and the READY signal outputted through terminal Sr of the flash lamp 30 is received by the camera 50 through its READY-terminal Cr, its exposure time is automatically set to the specified length convenient for synchronization, as explained above. At the same time, the "high" voltage READY signal makes the transistor 15 conductive. If the shutter button is pressed under this condition and the switch 51 is closed, the current passing through the transistor 15 passes through the switch 51 to the flash lamp 30, causing it to emit flash light.

If the link switch 13 is OFF, the READY signal from the flash lamp 30 is not communicated to the READY-terminal Cr, and the exposure time of the camera 50 is not automatically set for synchronization with the flash light emission. In the meantime, the transistor 15 remains non-conductive and, even if the shutter button is pressed, no electrical signal will be transmitted to the flash lamp 30 to cause the emission of flash light.

Figure 6:
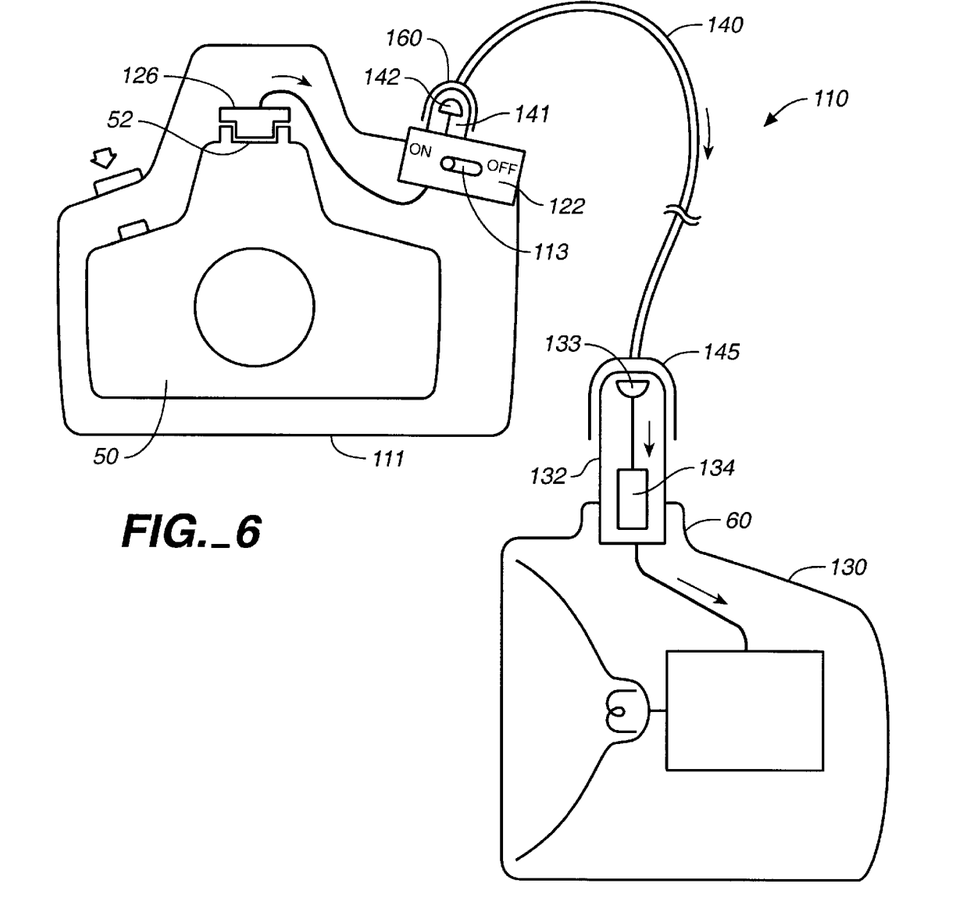
FIG. 6 is a schematic structural diagram of another system embodying this invention with an underwater camera connected with a flash lamp by a cable for transmitting light signals.

FIG. 6 shows schematically another system 110 embodying this invention for underwater photography with a camera 50 protected inside a water-proof housing 111 and a flash lamp 130 connected thereto by an optical cable 140 for transmitting light signals therethrough. Since the optical cable 140 is for optical communication only and not adapted to transmit electrical signals, and since the flash lamp 130 is not adapted to transmit any optical signal playing the role of the electrical READY signal described above, the camera 50 in this system 110 cannot receive from the flash lamp 130 any signal indicative of its ready condition or thereby automatically set the exposure time for synchronizing the opening of the shutter with the emission of flash light. In view of the above, the camera housing 111 of this system 110 is provided with a link switch 113 of a different kind on an outer surface of its photoelectric circuit box 122. This link switch 113 is different in that it serves to output an electrical quasi-READY signal when it is in ON condition and to transmit it to the camera 50.

FIG. 6 is only a schematic representation and hence is not intended to show exact positions of various components. The photoelectric circuit box 122 is actually disposed on the inner surface of a water-proof wall of the housing 111, and the link switch 113 is structured as explained above with reference to FIG. 4 with a magnet button and a magnetic response sensor so as to be operable from outside by the user. As explained above with reference to FIG. 3, the camera 50 is provided with an electrical connector 52 to which is connected a housing circuit connector 126 extended from the photoelectric circuit box 122. When the aforementioned electrical quasi-READY signal, outputted from the link switch 113, is received by the camera 50 through the housing circuit connector 126 and the electrical connector 52, the exposure time is automatically set, as when a READY signal is received directly from the flash lamp 30 as described above with reference to FIG. 1. When the shutter button of the camera 50 is pressed thereafter, not only is the shutter opened to start taking a picture but a START signal is also transmitted from the camera 50 to the flash lamp 130, as will be explained below in detail.

The START signal is transmitted first as an electrical signal (indicated by an arrow) from the electrical connector 52 to a signal conversion circuit inside the photoelectric circuit box 122 and is thereby converted into a command signal for causing a light-emitting element 142 inside a light-emitting part 141 to emit a corresponding light signal. The light signal thus emitted from the light-emitting element 142 is transmitted through the optical cable 140 (as indicated by another arrow) to a light-sensing unit 132 at its opposite end and is detected by a light sensor 133 inside the light-sensing unit 132. The light signal is thereby converted again into an electrical signal, which is in turn converted by a signal conversion circuit 134 inside the light sensing unit 132 and then is transmitted as an electrical control signal (as indicated by still another arrow) for the flash lamp 130 for causing it to immediately start emitting light. As the emitted flash light is reflected by a target object and is received by the camera 50 through its lens (not shown), the camera 50 quickly calculates a proper exposure and transmits an electrical STOP signal to the flash lamp 130 through the optical cable 140, as described above for the transmission of the START signal, so as to control the amount of emitted light from the flash lamp 130 accordingly. Upon receiving the STOP signal, the flash lamp 130 stops the emission of light immediately, and the shutter of the camera 50 is closed shortly thereafter to complete the picture-taking sequence.

If the user wishes to take a picture under a natural-light condition, the link switch 113 is kept in the OFF condition such that the quasi-READY signal is not generated and hence is not received by the camera 50. As a result, the exposure time of the camera 50 is not automatically set, and an exposure time suitable to the given natural-light condition can be freely selected. Circumstances under which such method of taking pictures is valuable have already been discussed above.

Until recently, the linking between an underwater camera and flash lamps was almost always through cables for transmitting electrical signals. Recently, however, the linking by optical signals is becoming more and more common. When a plurality of photosensitive flash lamps are used such that one of them will serve as a main and the others as slaves, transmission of signals between the main and the slaves may be accomplished without a cable but by the transmission of light through the water especially where it is desired to increase the range of light receivable by the light sensor 133 or the sensitivity of light reception.

Figure 7:
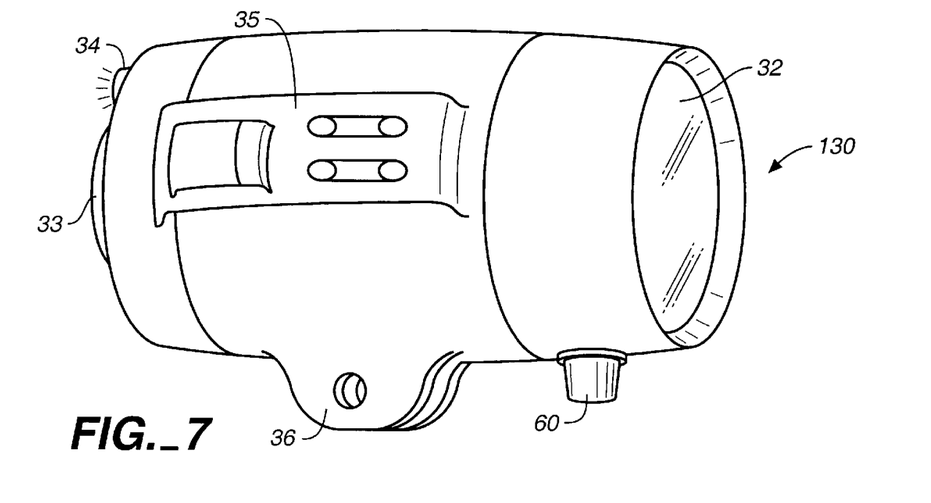
FIG. 7 is a schematic external view of a photosensitive flash lamp of a type usable selective either as a main or a slave.

A photosensitive flash lamp 130 which can be used thus selectively either as a main or a slave may be structured, for example, as shown in FIG. 7, having not only an input port 60 (also schematically indicated in FIG. 6) but also a light-emitting unit 32 on its front part, an opening 33 for battery exchange and an indicator lamp 34 for indicating the charged condition of the battery on the back side and an input part 35 and an attachment structure 36. The input part 35 may include a luminosity switch and a power switch (such as indicated at 31 in FIG. 1) and is the part on which the user can select various functions of the lamp 130. The attachment structure 36 is a part at which a supporting member (such as the arm which was illustrated at 42 in FIG. 1) is adapted to be fastened.

Figure 8A:
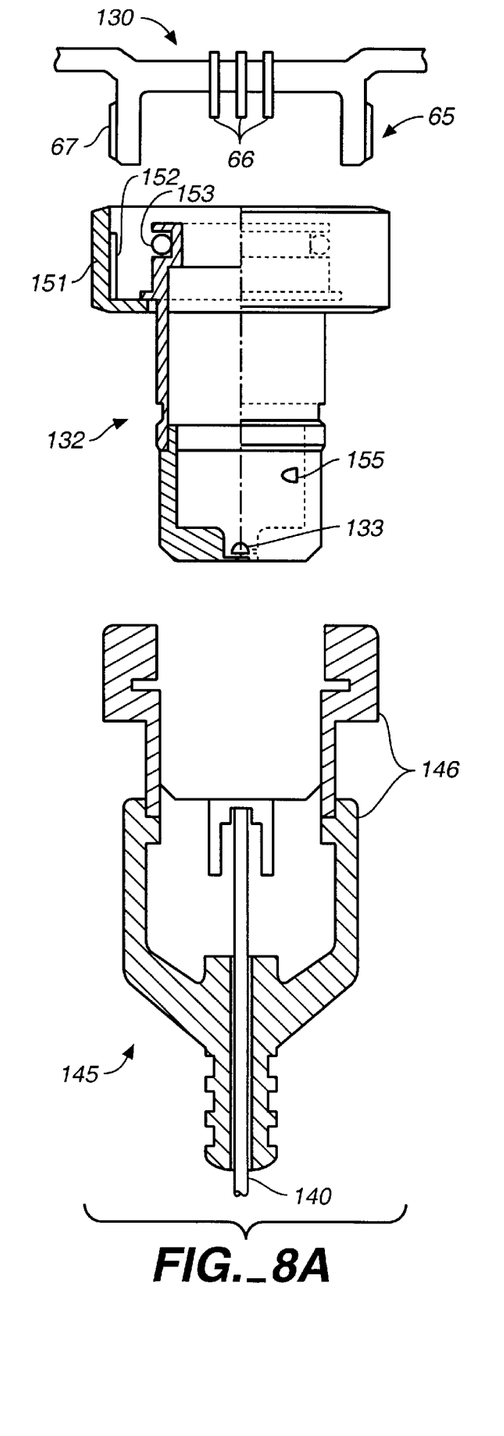
FIGS. 8A and 8B are sectional views of the light-sensing unit when it is and is not attached to the connector part of the flash lamp of FIG. 7 and to end of the optical cable.
Figure 8B:
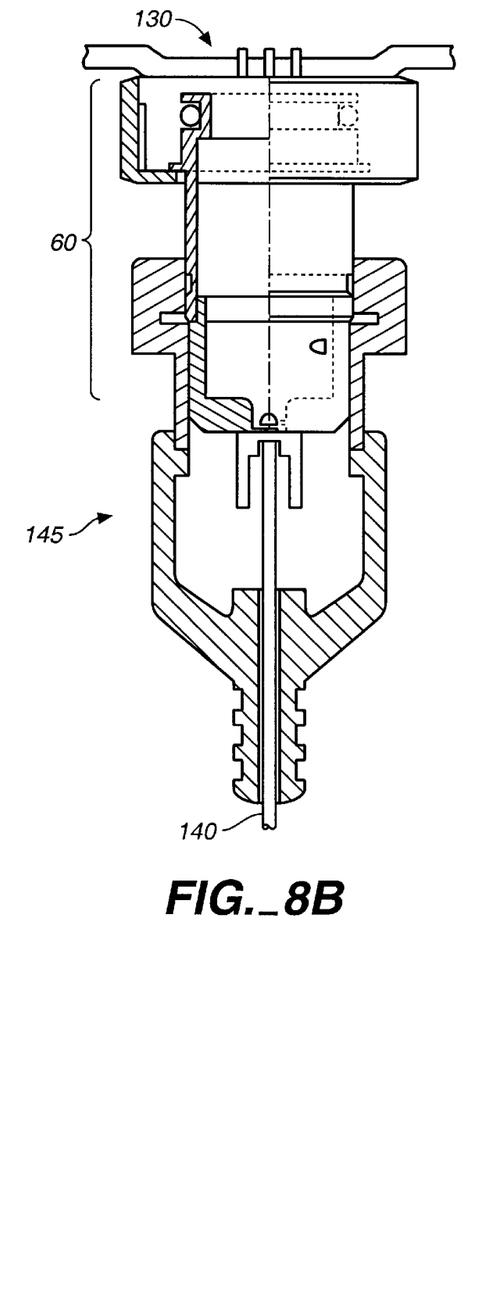

The input port 60 has a light-transmitting water-proof window which contains therein the light-sensing unit (shown schematically at 132 in FIG. 6) and a signal conversion circuit 134 connected to the light-emitting unit 32. It is a compact structure on the housing of the lamp 130, and may be integrally formed as a part of the main body of the lamp 130, as shown schematically in FIG. 6 and will be described more in detail with reference to FIGS. 8A ad 8B.

Figure 9:
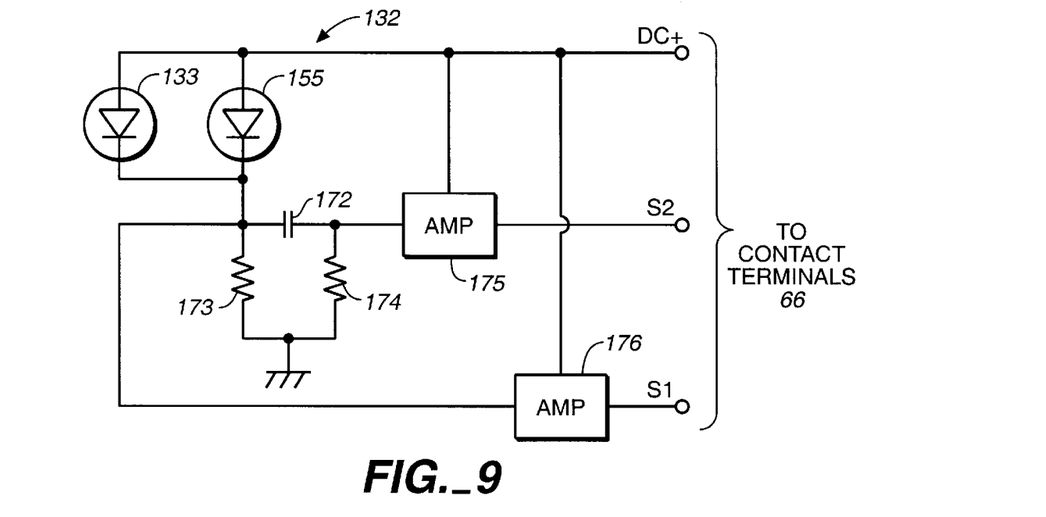
FIG. 9 is a circuit diagram of the light-sensing unit.

The light-sensing unit 132 has a rotatable ring 151 with a female screw 152 on its inner surface. The housing of the lamp 130 has on its outer surface an electrical connector part 65 of a tubular structure around contact terminals 66. A matching male screw 67 is formed outside this tubular structure and engages with the female screw 152 on the light-sensing unit 132. As the light-sensing unit 132 is thus attached to the connector part 65 of the lamp housing, terminals of the electronic circuit inside the light-sensing unit 132 (as shown in FIG. 9 by symbols DC+, S1 and S2) become electrically connected to the aforementioned contact terminals 66. Numeral 153 indicates an O-ring made, for example, of a rubber material for securing a water-tight sealing between the connector part 65 and the light-sensing unit 132.

The light-sensing unit 132 is a small unit about the size of a thumb. It includes a light-receiving part having the light sensor 133 (shown schematically also in FIG. 6) which may be supported by a circuit board behind a light-transmitting water-proof window made, for example, of a transparent resin material, as well as the aforementioned signal conversion circuit 134 for generating an electrical signal for causing the light-emitting unit 32 to emit flash light or stop its light emission on the basis of a light signal received through the signal receiving part.

The light-sensing unit 132 is provided further with an additional light sensor 155, although not shown in FIG. 6, structured similarly to the light sensor 133 but positioned and oriented for receiving light emitted from another flash lamp serving as a main and propagating through the water.

The optical cable 140 may comprise a plastic optical fiber, at one end of which is a connector 145 for connecting it to the input port 60 of the lamp 130, having a cover 146 made of a non-transparent material such as rubber, a metal or a plastic material. At the opposite end of the optical cable 140 is another connector 160 (as shown in FIG. 6) for connecting the optical cable 140 to the camera 50 (or, more exactly, to its light-emitting part 141). If a sufficiently flexible plastic material is used, the optical cable 140 may be formed as an extendable coil.

FIG. 9 is an example of a circuit structure of the light-sensing unit 132. When the light sensor 133 or 155 detects a rapidly rising light signal, a positive voltage is generated across resistor 173, and this voltage is amplified by amplifier 176 and outputted through terminal S1 to the flash lamp 130 to serve as the START signal. When a rapidly falling signal is detected, say, some milliseconds later, a rapidly falling negative signal is generated by a differential circuit formed with capacitor 172 and resistor 174. This is amplified by amplifier 175, which is set so as to function only on negative signals, and is outputted through terminal S2 to the flash lamp 130, say, to serve as the STOP signal.

The light signals (START and STOP) emitted from the lightemitting part 141 are extremely weak. The optical cable 140 serves to transmit these weak signals to the light sensor 133 while excessive attenuation. The light-sensing unit 132 does not require a separate power source because it can store the READY signal received from the flush lamp 130 in its capacitor 172.

Figure 10A:
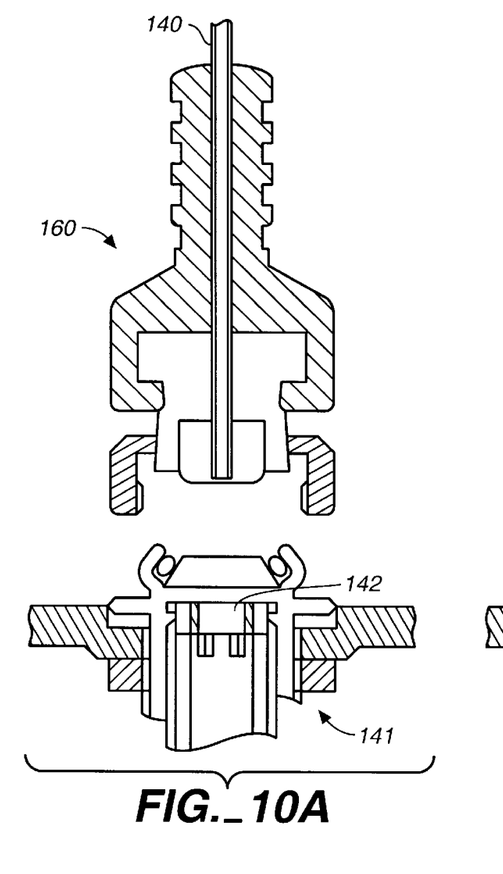
FIGS. 10A and 10B are sectional views of the connector on the optical cable for its connection with the camera when they are separated and when they are connected.
Figure 10B:
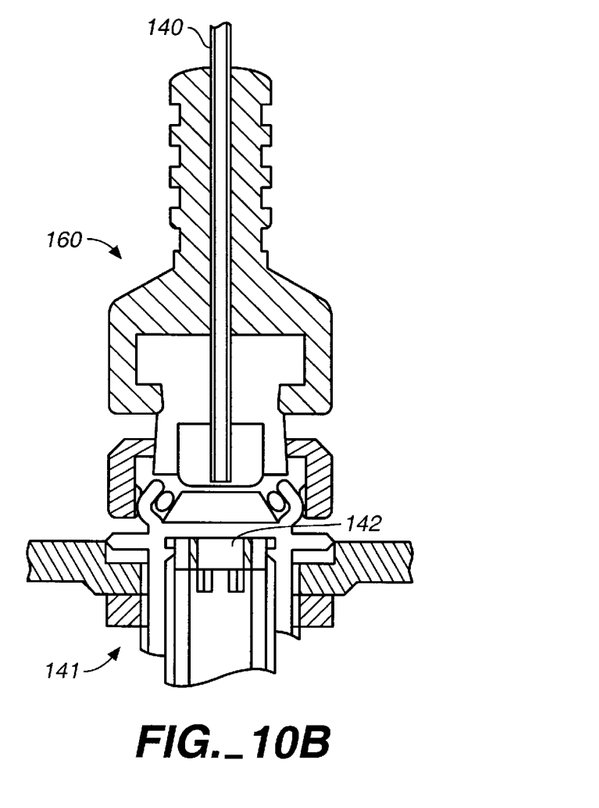

FIGS. 10A and 10B show the connector 160 by which the optical cable 140 is connected to the camera 50, or the light-emitting part 141 of its housing 111. The connector 160 to the camera 50 is structured similarly to the connector 145 to the input port 60 of the lamp 130, having a cover 161 made of a non-transparent material such as rubber, a metal or a plastic material which can be engaged with and affixed to the camera housing 111 easily by a single touch of a hand.

The light-emitting part 141 is formed on the outer surface of the camera housing 111 so as to be partially exposed to the exterior. The light-emitting element 142 therein may comprise a light-emitting tube such as an LED or a light guide extended from a light-emitting element such as a internally contained flash lamp. If the light-emitting element 142 is an LED, it may be activated by an electric signal generated within the camera 50 and communicated through the electrical connector 52, the housing circuit connector 126 and a signal conversion circuit inside the photoelectric circuit box 122.

Figure 11:
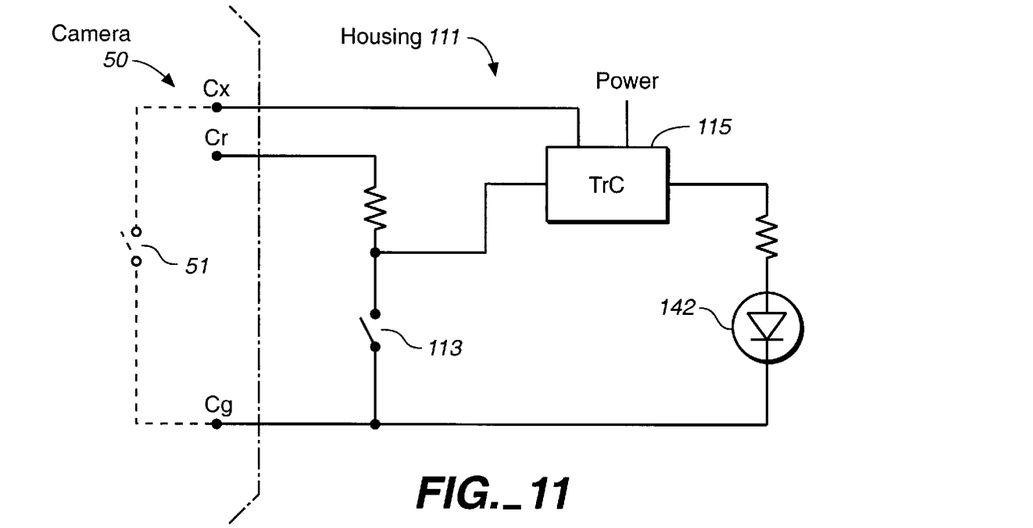
FIG. 11 is an example of circuit diagram around the link switch of the circuit box of FIG. 6.

FIG. 11 is a circuit diagram showing an example of circuit structure including a transistor circuit 115 around the link switch 113 of the circuit box 122 for a camera-flash lamp system of the kind (such as those produced by Canon) that uses a "low" voltage applied to the READY-terminal Cr of the camera 50 as the READY signal (by which the camera 50 learns that the flash lamp is ready to emit flash light). When the link switch 113 is switched on, the READY-terminal Cr of the camera 50 is connected to a ground terminal Cg and its voltage becomes "low". Receiving this "low" signal, the camera 50 becomes ready to take a picture with flash light, setting its exposure time (about 1/125 sec) for synchronization with the flash. At the same time, the switch 51 of the camera 50 comes to be in a signal-communicating relationship with the light-emitting element 142 inside the light-emitting part 141 through the transistor circuit 115. Thus, if the shutter button of the camera 50 is pressed thereafter and the switch 51 is closed, the electric flash-activating signal transmitted to the transistor circuit 115 is converted into a driving signal to the light-emitting element 142, causing the light-emitting element 142 to emit a signal through the optical cable 140. The flash lamp 130 is thereby activated and emit flash light, as explained above. When the link switch 113 is in OFF condition, the voltage at the READY-terminal Cr of the camera 50 is not low. As a result, the exposure time of the camera 50 is not automatically set and the transistor circuit 115 serves to cut of the signal-communicating relationship between the switch 51 of the camera 50 and the light-emitting element 142. Thus, the light-emitting element 142 does not emit light even though the shutter button of the camera 50 is pressed, and hence no flush light is emitted from the flush lamp 130.

Figure 12A:
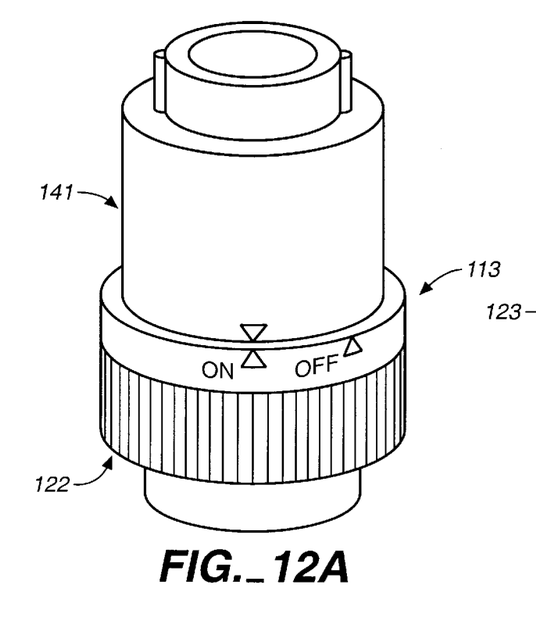
FIG. 12A is an external view of a unified structure incorporating the light-emitting part, the photoelectric circuit box and the link switch of FIG. 6.
Figure 12B:
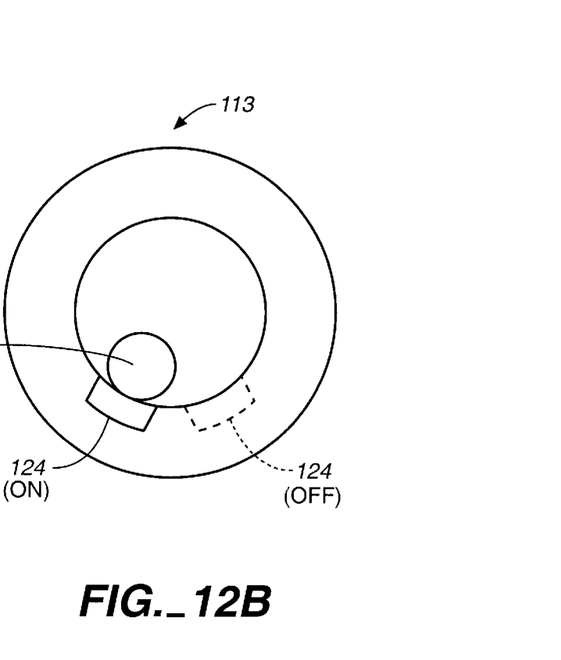
FIG. 12B is a sectional view showing the arrangement of a magnet button and a magnetic response sensor in the structure of FIG. 12A.

FIG. 12A shows how the light-emitting part 141, the photoelectric circuit box 122 and the link switch 113 can be integrated into a single unit. A camera housing of this invention for underwater photography with a terminal for connection to an optical cable can be formed by attaching such a unit to the ordinary terminal of the camera for receiving only electrical signals. FIG. 12B shows how a magnet button 124 and a magnetic response sensor 123, respectively corresponding to the magnet button 24 and the magnetic response sensor 23 described above with reference to FIG. 3, may be arranged in the unit shown in FIG. 12B.

The invention has been described above with reference to only a limited number of examples but these examples are not intended to limit the scope of the invention. Many modifications and variations are possible within the scope of the invention. For example, a combination of a camera and a flash lamp may be formed by connecting them both with a cable for transmitting optical signals and another cable for transmitting electrical signals. Such a combination is not illustrated separately but one may visualize such a system by combining FIGS. 1 and 6. In summary, the disclosure is intended to be interpreted broadly and all such modifications and variations that may be apparent to a person skilled in the art are intended to be within the scope of this invention.

What is claimed is:

1. An underwater camera housing for enclosing a camera for use with a flash unit, said underwater camera housing comprising:

a cable connector terminal provided on an external surface, said connector terminal serving to be connected to a cable which is connected to the flash unit for transmitting signals therethrough; and a switch on said external surface for allowing and disallowing signal transmission between the camera and the flash unit through the cable.

2. The underwater camera housing of claim 1 wherein said cable serves to transmit electrical signals therethrough.

3. The underwater camera housing of claim 1 wherein said cable serves to transmit optical signals therethrough; said underwater camera housing further comprising a photoelectric circuit inside said underwater camera housing for generating an electrical quasi-ready signal to be transmitted to the camera to prepare the camera for flash photography and for converting an electrical signal from the camera addressed to the flash unit into an optical signal and transmitting said optical signal through said cable to said flash unit.

4. The underwater camera housing of claim 3 wherein said quasi-ready signal is prevented from being generated and transmitted to the camera when said switch is set to disallow transmission of optical signals through said cable between the flash unit and the camera.

5. The underwater camera housing of claim 1 comprising:

an electrical cable connector terminal provided on an external surface serving to be connected to an electrical cable which is connected to the flash unit for transmitting electrical signals therethrough;

an optical cable connector terminal provided on said external surface serving to be connected to an optical cable which is connected to the flash unit for transmitting optical signals therethrough; and a photoelectric circuit inside said underwater camera housing for generating an electrical quasi-ready signal to be transmitted to the camera to prepare the camera for flash photography, transmitting electrical signals from the camera addressed to the flash unit to said electrical cable connector terminal as electrical signals; converting the electrical signals from the camera addressed to the flash unit into optical signals and transmitting the converted optical signals to said optical cable connector terminal, and preventing said quasi-ready signal from being generated and transmitted to the camera when said switch is set to disallow transmission of signals through said cable between the flash unit and the camera.

6. A control unit on an externally facing surface of a water-proof underwater camera housing enclosing a camera therein, said control unit comprising:

means for connecting an optical cable through which optical signals are transmitted between said control unit and a flash unit;

means for electrically connecting to said camera;

means for converting an electrical signal into an optical signal; and means for selectively allowing and disallowing transmission of signals between said flash unit and said camera.

* * * * *